United States Patent
Clark et al.

(10) Patent No.: US 6,664,775 B1
(45) Date of Patent: Dec. 16, 2003

(54) APPARATUS HAVING ADJUSTABLE OPERATIONAL MODES AND METHOD THEREFORE

(75) Inventors: Lawrence T. Clark, Phoenix, AZ (US); Michael W. Morrow, Chandler, AZ (US); Gregory B. Tucker, Chandler, AZ (US); Yuan-Po Ypt Tseng, Chandler, AZ (US); Ali Minaei, Chandler, AZ (US); Jay Heeb, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/643,082

(22) Filed: Aug. 21, 2000

(51) Int. Cl.[7] .................................................. H02J 3/12
(52) U.S. Cl. ...................... 323/351; 323/354; 323/284; 323/286
(58) Field of Search ................................ 323/351, 352, 323/353, 354, 284, 286, 288

(56) References Cited

U.S. PATENT DOCUMENTS

| | | | | |
|---|---|---|---|---|
| 5,153,535 A | | 10/1992 | Fairbanks et al. | 331/143 |
| 5,278,874 A | * | 1/1994 | Liu et al. | 375/120 |
| 5,451,892 A | * | 9/1995 | Bailey | 327/113 |
| 5,627,412 A | | 5/1997 | Beard | 307/82 |
| 5,724,007 A | * | 3/1998 | Mar | 331/1 A |
| 5,760,636 A | | 6/1998 | Noble et al. | |
| 5,812,860 A | | 9/1998 | Horden et al. | 395/750.04 |
| 5,977,836 A | * | 11/1999 | Swan et al. | 331/1 A |
| 6,049,254 A | * | 4/2000 | Knapp et al. | 331/16 |
| 6,154,095 A | * | 11/2000 | Shigemori et al. | 331/16 |
| 6,163,186 A | * | 12/2000 | Kurita | 327/157 |
| 6,163,583 A | * | 12/2000 | Lin et al. | 375/354 |

FOREIGN PATENT DOCUMENTS

| | | |
|---|---|---|
| EP | 0 766 404 A2 | 4/1997 |
| EP | 0 992 876 A2 | 4/2000 |

OTHER PUBLICATIONS

PCT Search Report dated Nov. 27, 2002.

* cited by examiner

Primary Examiner—Bao Q. Vu
(74) Attorney, Agent, or Firm—Kenneth M. Seddon

(57) ABSTRACT

Briefly, in accordance with one embodiment of the invention, an integrated circuit has a voltage regulator and a clock divider that may be used to adjust the operational frequency and/or voltage potential of the integrated circuit to reduce the power consumption of the integrated circuit while in operation.

34 Claims, 5 Drawing Sheets

APPARATUS HAVING ADJUSTABLE OPERATIONAL MODES AND METHOD THEREFORE

BACKGROUND

In general, the use of a portable communication or computing device (e.g., a cell phone, a personal digital assistant (PDA), etc.) is limited, at least in part, by the amount of power that may be provided by a battery. A conventional technique to reduce the amount of power consumed by a portable device is to lower the operational voltage range of at least a portion of the portable device when not in use. For example, it may be desirable to place the processor associated with the portable device into a standby, low power mode when the processor is not in use.

Alternatively, the operational frequency of the processor may be reduced when the processor is not in use. However, with conventional processors, the execution of instructions by the processor is halted while the frequency is lowered so that the processor does not lose synchronization while the frequency is adjusted. Halting of the processor may reduce the throughput of the processor and create inconvenient delay for the user. Thus, a need exists to reduce the power consumption of a processor while reducing the impact on the processor's efficiency and the amount of inconvenience created for the user.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
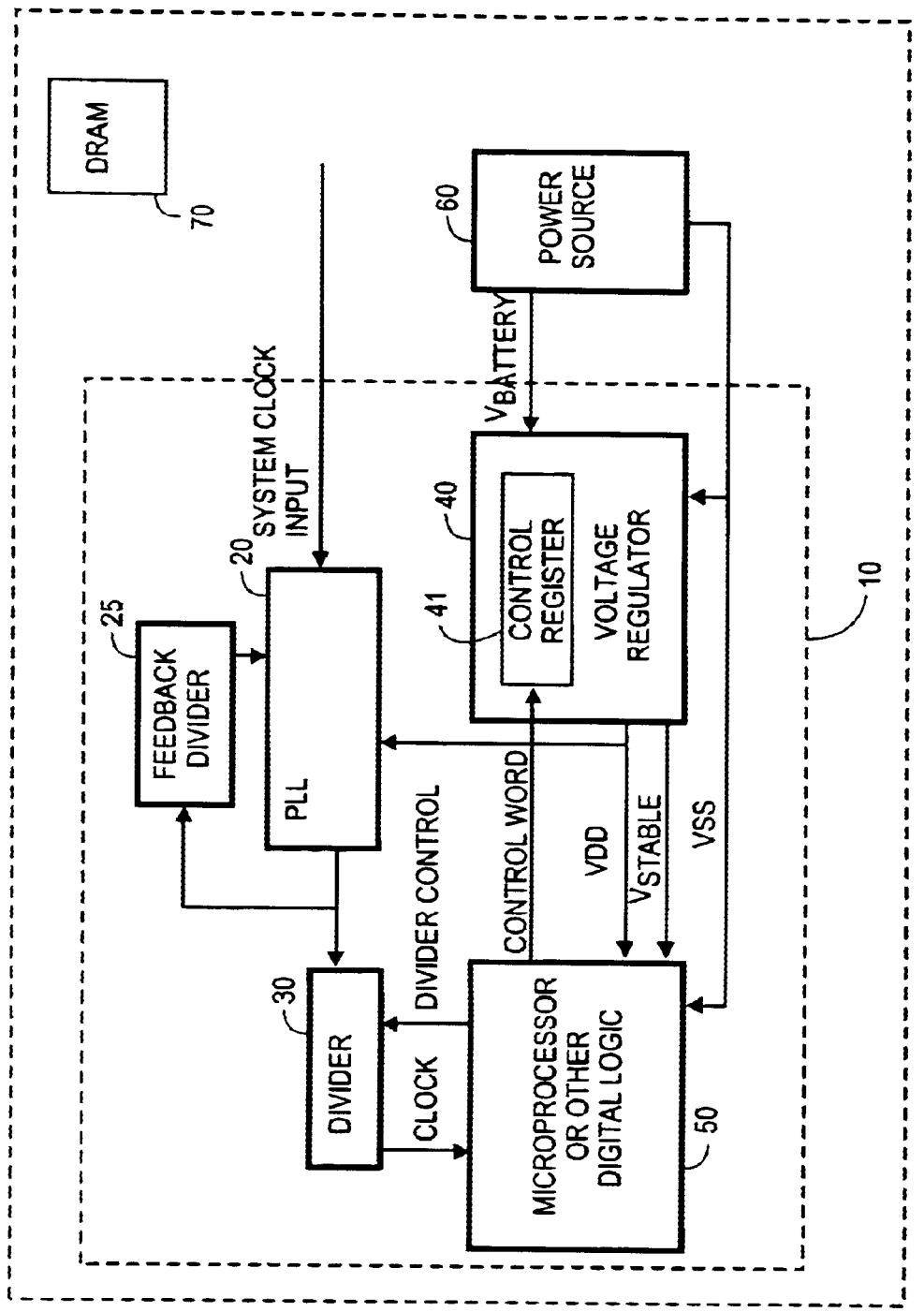
FIG. 1 is a block diagram representation of an embodiment in accordance with the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description which follow are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may also mean that two or more elements are in direct physical or electrical contact. However, "coupled" may also mean that two or more elements are not in direct contact with each other, but yet still co-operate or interact with each other.

Turning to FIG. 1, an embodiment 100 in accordance with the present invention is described. Embodiment 100 may comprise a portable device such as a mobile communication device (e.g., cell phone), a two-way radio communication system, a one-way pager, a two-way pager, a personal communication system (PCS), a portable computer, or the like. Although it should be understood that the scope and application of the present invention is in no way limited to these examples.

Embodiment 100 here includes an integrated circuit 10 that may comprise, for example, a microprocessor, a digital signal processor, a microcontroller, or the like. However, it should be understood that only a portion of integrated circuit 10 is included in FIG. 1 and that the scope of the present invention is not limited to these examples. Integrated circuit 10 may include core digital logic or core logic 50 that may comprise one or more transistors. Although the scope of the present invention is not limited in this respect, core logic 50 may comprise the transistors that execute instructions such as, for example, the instructions associated with a user program or application.

Integrated circuit 10 may also include a voltage regulator 40 adapted to provide power to core logic 50 while integrated circuit 10 is in operation. As shown in FIG. 1, voltage regulator 40 may be integrated into integrated circuit 10. For example, voltage regulator 40 may be formed on the same portion of semiconductor material as integrated circuit 10. However, the scope of the present invention is not limited in this respect. In alternative embodiments, voltage regulator 40 may be separate from integrated circuit 10. Voltage regulator 40 may be used to control or step-down the voltage potential provided by a power source 60, which may be, for example, a battery, although the scope of the present invention is not limited in this respect.

During the operation of integrated circuit 10, voltage regulator may provide core logic 50 with an operational voltage range (e.g., Vdd–Vss). In an alternative embodiment, voltage regulator 40 may comprise a control register 41 that may be set or programmed to indicate the voltage potentials to be provided. For example, core logic 50 may write a control word to control register 41 to indicate the voltage potentials to be provided by voltage regulator 40. As explained in more detail below, the voltage potential range provided to core logic 50 by voltage regulator 40 may be adjusted depending, at least on part, on the desired frequency at which core logic 50 is to operate. For example, the voltage potential range provided by voltage regulator 40 may be lowered to save power if core logic 50 may operate at a lower frequency. In addition, the voltage potential range may be increased if it is desired that the frequency be increased.

Integrated circuit 10 may also comprise a phase lock loop (PLL) 20. PLL 20 may be used, at least in part, to provide a synchronizing clock signal while integrated circuit 10 is in operation. As indicated in FIG. 1 in accordance with this particular embodiment, the clock signal provided by PLL 20 may be provided to a feedback divider 25 and a clock divider 30. PLL 20 may compare the output signal provided by feedback divider 25 to a reference clock signal and make appropriate adjustments (e.g., increase or decrease the voltage potential applied to a voltage controlled oscillator) so PLL 20 provides the desired clock signal as an output signal.

For example, PLL 20 may comprise a phase or frequency detector that may be used to compare the reference clock signal to the output of feedback divider 25 in a feedback arrangement. A charge pump may be used to increase or decrease the voltage applied to a voltage controlled oscillator (VCO), which in turn, adjusts the clock signal provided by PLL 20. As shown in FIG. 1, the output of PLL 20 is not only provided to feedback divider 25, but is also provided to a clock divider 30, which, in turn, may be used to independently divide the clock signal before it is provided to core logic 50. In alternative embodiments, clock divider 30 may be used to generate multiple clock signals (e.g., more than one clock signal) that have different frequencies and that are provided to different portions of integrated circuit 10.

In contrast, conventional PLL's typically include a single feedback divider that not only provides a feedback clock signal that is compared to a reference clock signal, but also provides the clock signal that is used to synchronize the operation of the core logic clock (e.g. a microprocessor). Thus, the feedback divider in a conventional circuit not only provides a clock signal to the core logic, but typically provides the feedback clock signal that is used to control the operation of the PLL. Since the clock signal provided by the clock divider in a conventional PLL is also provided to the core logic, the operation of the core logic may be halted when the voltage or frequency associated with the PLL is adjusted. Since the operation of the processor is halted when the frequency or voltage potential range is changed, the efficiency and throughput of conventional processors may be reduced.

However, particular embodiments of the present invention in accordance with that shown in FIG. 1, may improve the throughput and efficiency of integrated circuit 10 because core logic 50 may remain in operation when the voltage potential applied to PLL 20 is adjusted. This is due, at least in part, because divider 30 may provide core logic 50 with a clock signal as the voltage potential applied to PLL 20 by voltage regulator 40 is adjusted. As indicated in FIG. 1, the output clock signal generated by clock divider 30 is not provided to PLL 20 and the operation of core logic 50 need not be constrained or halted due to the output signal provided by feedback divider 25. In some embodiments, although not necessarily all, the phase of the clock signal provided by clock divider 30 may be slightly out of phase with respect to the output signal of feedback divider 25 or the system reference clock. Consequently, in some embodiments, it may be desirable that core logic 50 comprise asynchronous buses and use asynchronous input/output (I/O) signals.

Figure 2:
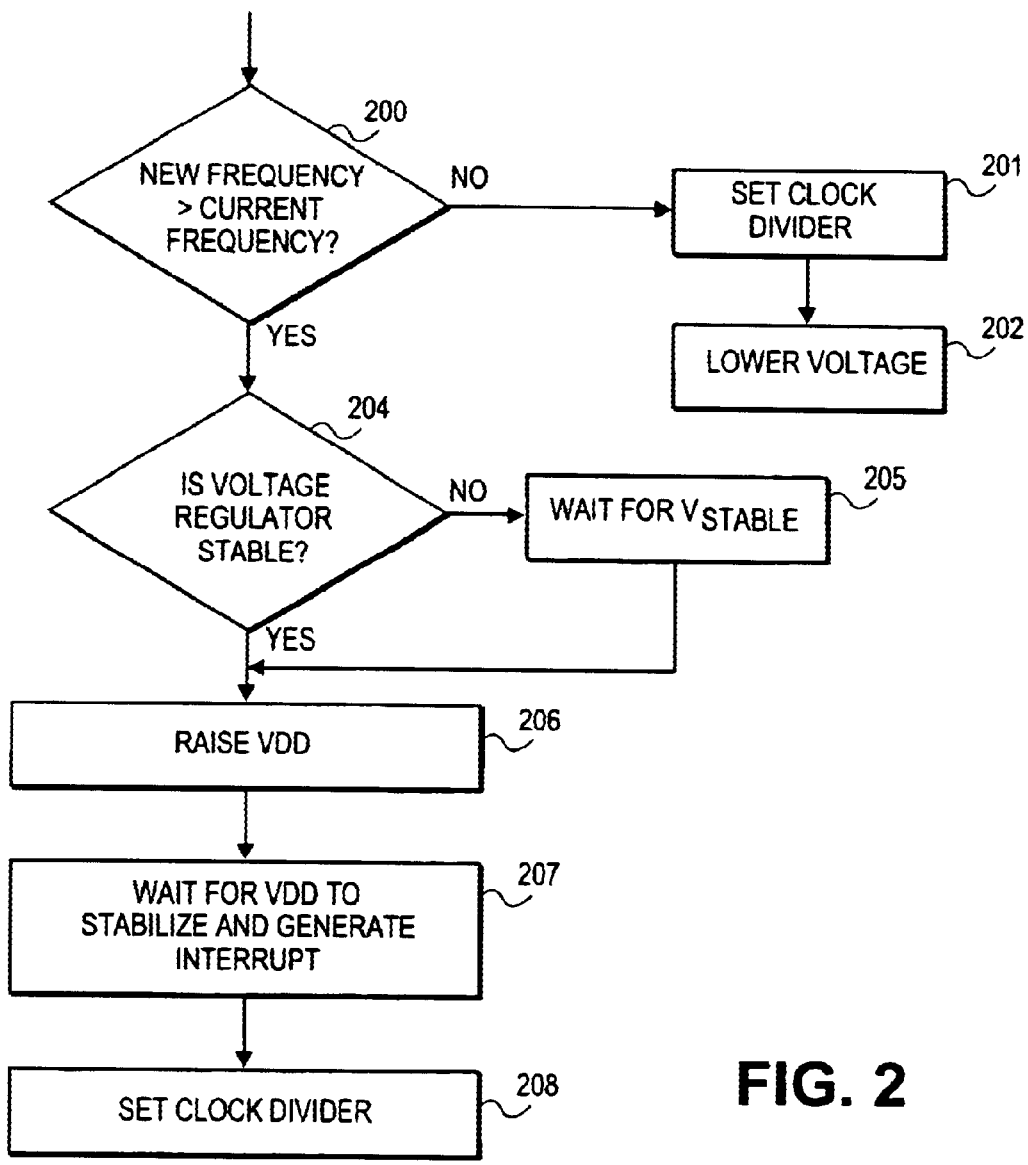
FIG. 2 is a flow chart of a method of reducing power consumption in accordance with a particular embodiment of the present invention.

Particular embodiments of the present invention may be used to reduce the power consumption of an integrated circuit while the integrated circuit is in operation. For example, if a user is executing an application that may be executed using a lower frequency without an appreciable degradation in performance experienced by the user, the frequency may be reduced to conserve power. Referring now to FIG. 2, a method of reducing power consumption in accordance with an embodiment of the present invention is provided. To begin, if the new frequency to be used by core logic 50 is less than the current frequency, block 200, then core logic 50 (see FIG. 1) may send control signals to clock divider 30 so that clock divider 30 provides a lower clock frequency to core logic 50.

Note, this may be done without affecting the operation of PLL 20, and thus, the frequency of the clock provided by feedback divider 25 may remain substantially constant or unchanged. Likewise, the clock frequency provided by clock divider 30 may be changed while core logic 50 is still in operation (e.g., executing instructions). Since power is related to the supply voltage by the familiar $P=CV^2f$, where f is the operating frequency, C is the switched capacitance, and V is the power supply voltage, a reduction in frequency may result in a linear reduction in power consumption. Thus, integrated circuit 10 may appreciate a nearly immediate benefit in power consumption by reducing the frequency of core logic 50.

Thereafter, core logic 50 may send control signals to control register 41 to reduce the voltage potential range provided by voltage regulator 40. This, in turn, may reduce the voltage potential range applied to all, or part, of core logic 50. Since power is proportional to the square of the voltage potential, the amount of power consumed by integrated circuit 10 may be reduced dramatically by lowering the supply voltage. Note that no work is missed by integrated circuit 10 since clocks are continuously applied in this example.

If the new frequency to be provided to core logic 50 is greater than the current frequency, block 200, then the voltage potential applied to core logic 50 may first be increased. Accordingly, core logic 50 may first determine if voltage regulator 40 is stable or changing, block 204. For example, if voltage regulator 40 is already in the process of increasing the voltage potential generated, then there may be no need to increase the voltage potential once it has reached the new value. Thus, if a signal (e.g. Vstable) is de-asserted, this may be used to indicate to core logic 50 that voltage regulator 40 is already in the process of increasing the voltage potential. Thus, core logic 50 may wait until the Vstable signal is asserted, block 205.

If voltage regulator is stable, but is not generating a sufficiently high voltage potential, then core logic 50 may program control registers 41 so that voltage regulator 40 raises the voltage potential range, block 206. While the voltage potential is increased by voltage regulator 40, it may be desirable to halt to execution of the process or thread that prompted the increase in voltage potential. Accordingly, core logic 50 may halt the execution of this particular process until voltage regulator 40 is stable. The signal Vstable may be used to generate an interrupt in core logic 50 to indicate that the voltage potential range is now higher and that this thread may continue execution, although the scope of the present invention is not limited in this respect. It should be noted, however, that there may be no need to halt the execution of other processes that were being executed by core logic 50 at the lower voltage potential. If the current voltage potential is sufficient, the operation of core logic 50 may continue, and thus, the operation may not be not appreciably affected while the voltage potential is increased. This, in turn, may increase the overall throughput and efficiency of integrated circuit 10, because the number of processes that are halted may be reduced.

Once the voltage potential has been increased, core logic 50 may send control signals to clock divider 30 so that the frequency of the clock signal provided to core logic 50 is increased, block 208. As shown in FIG. 1, embodiment 100 may include a memory device, such as a dynamic random access memory (DRAM) 70 that may contain the instructions for controlling the sequence of events use to raise or lower the frequency and voltage potential of integrate circuit 10 while in operation.

Figure 3:
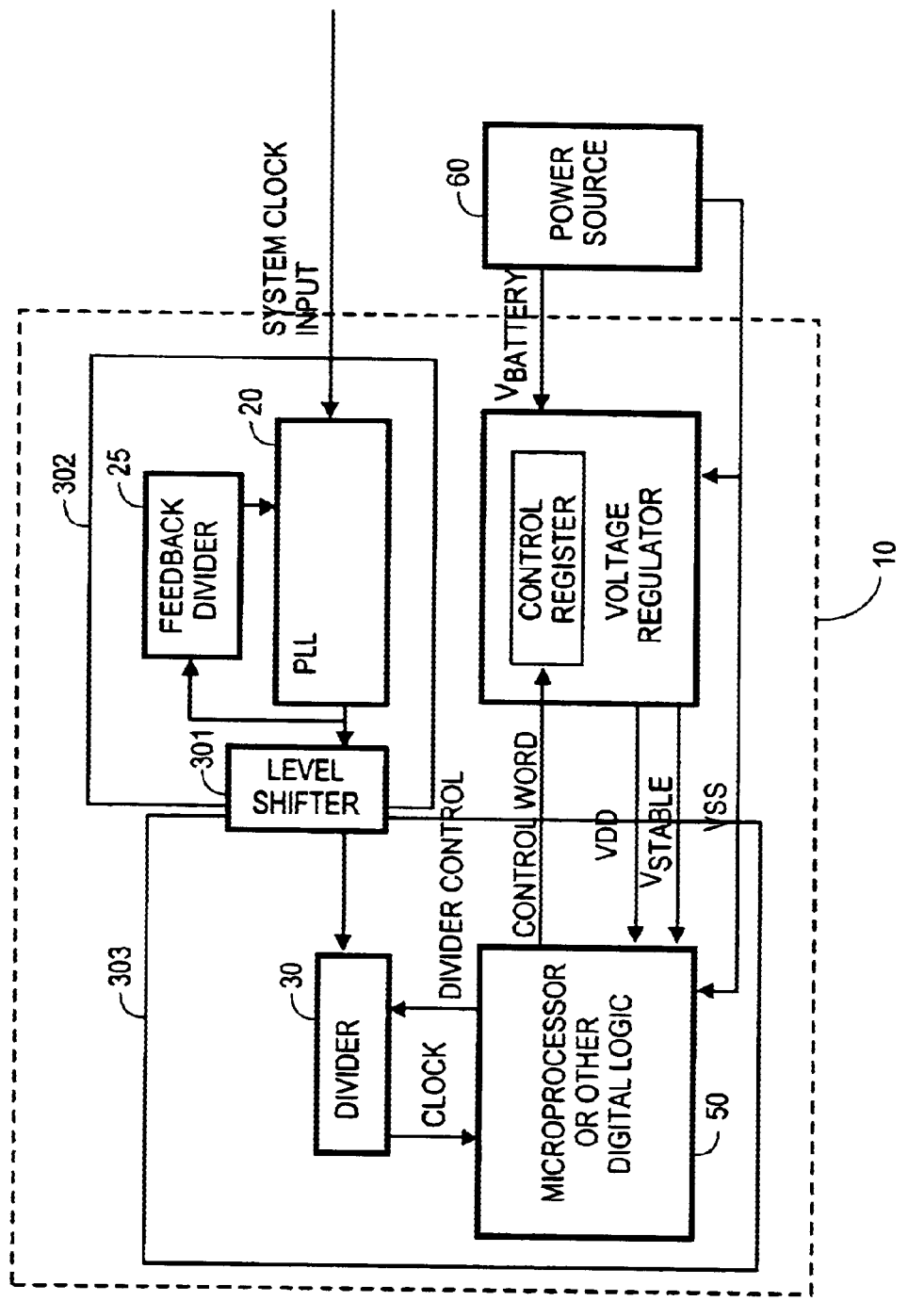
FIG. 3 is a block diagram representation of an alternative embodiment of the present invention.

Referring now to FIG. 3, an embodiment 300 in accordance with the present invention is provided. As shown, integrated circuit 10 may be divided into one or more voltage domain regions 302–303. The operational voltage range within domain regions 302–303 may vary with respect to each other. For example, the transistors within voltage domain region 302 may be powered with a Vdd voltage potential of about 3.0 volts relative to ground, while the transistors within voltage domain region 303 may be powered with a voltage potential of about 0.9 volts relative to ground. It should be understood that the scope of the present invention is not limited to these particular voltage potentials. In alternative embodiments, the voltage potential range of voltage domain region 302 may range from 1–5 volts while the voltage potential range of voltage domain region 303 may range from 0.3–1 volts.

Although the scope of the present invention is not limited in this respect, PLL 20 may be connected to a separate power supply source so that the voltage potential range of voltage domain region 303 may be lowered with respect to voltage domain region 302 without affecting the operation of PLL 20. Integrated circuit 10 may include a level shifter 301 that may be used to convert the voltage potential range of a signal from voltage domain region 302 to the appropriate voltage potential range of voltage domain region 303.

Particular embodiments of the present invention may recognize a combined linear frequency and square law voltage reduction improvement in power consumption when the computational demand is low. The processor power supply voltage, and hence, the power consumption, may be controlled via software running on the processor, as well as the operating frequency in a dynamic, on-demand fashion. The controlling operating system, upon determining that a computationally intensive task is beginning, may set bits which control both the operating frequency and the power supply voltage, allowing the power consumption to be lowered for any given task while still delivering the desired computational performance. When the computationally intensive task is completed, the same mechanism may be used to lower the supply voltage and frequency to a very low state. During these transitions, the clock may be continue to run, allowing useful work to be performed.

Figure 4:
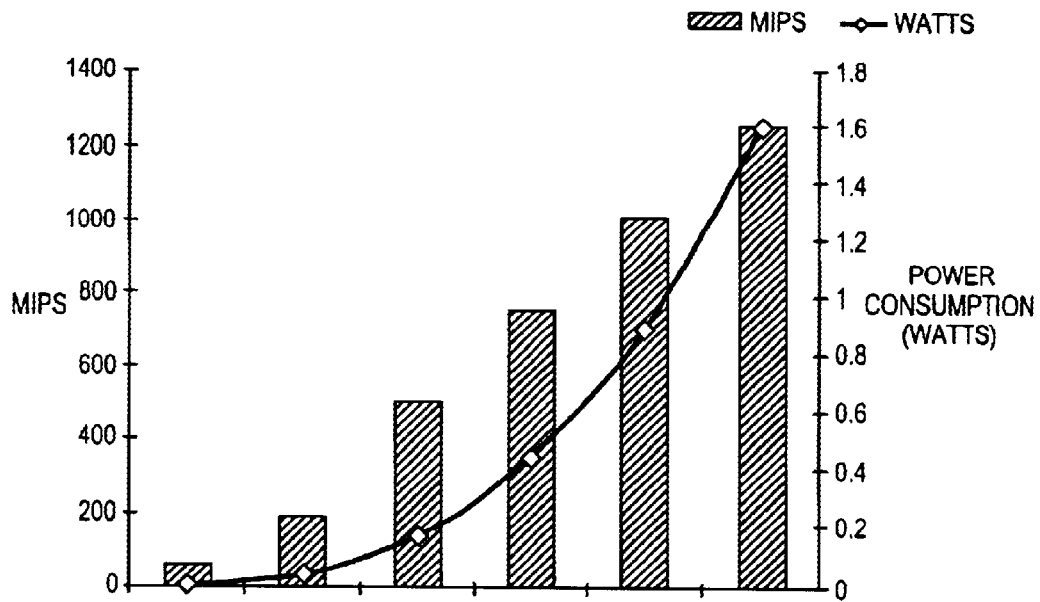
FIG. 4 is a graph illustrating the improvement in power consumption that may be recognized by particular embodiments of the present invention.
Figure 5:
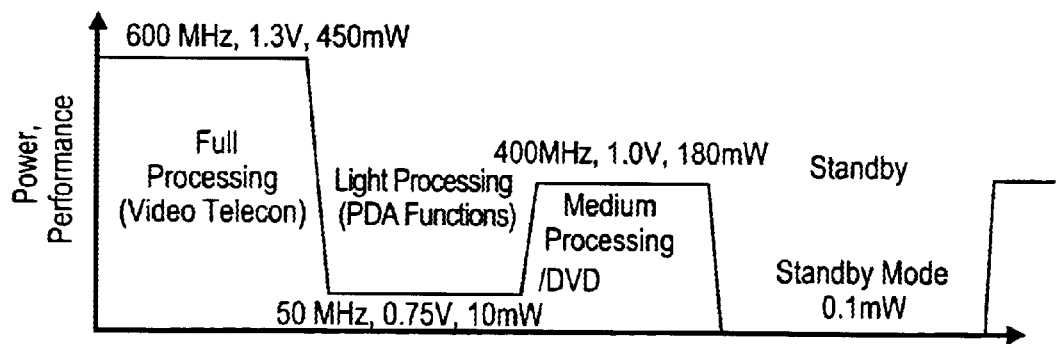
FIG. 5 is a graph illustrating the amount of power that may be consumed by various applications.
Figure 6:
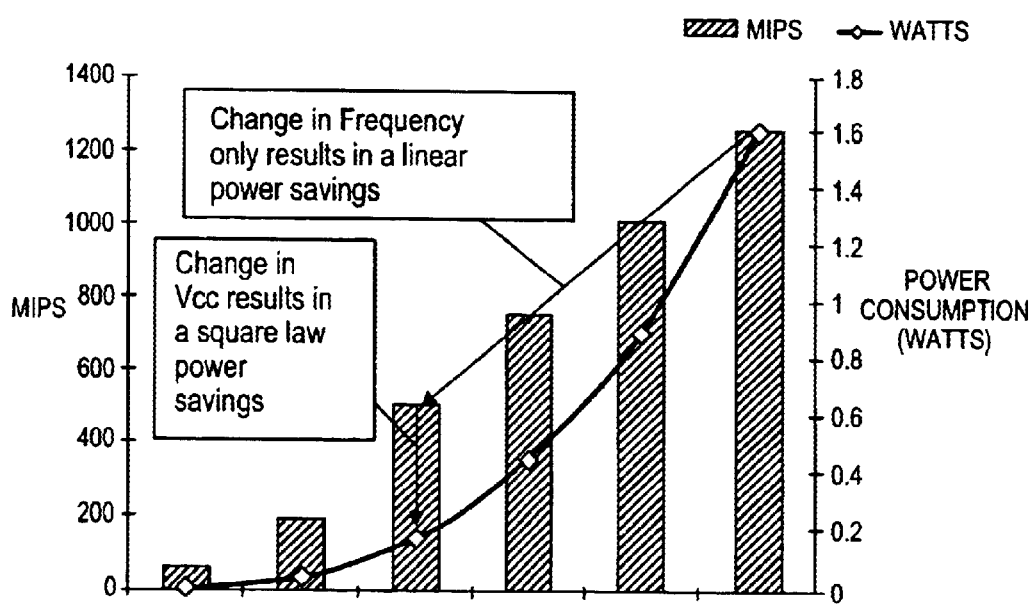
FIG. 6 is a graph illustrating the improvement in power consumption that may be recognized by particular embodiments of the present invention.

FIG. 4, is provided to illustrate the performance of a processor as the power consumption is adjusted by changing the operational frequency and voltage of the processor. FIG. 5 illustrates how the power consumption of a processor may be adjusted to provide the performance desired for particular user and system applications. FIG. 6 illustrates the improvements in power consumption that may be recognized by adjusting the operational frequency and voltage potential range.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus comprising:
   a static random access memory; and
   a processor coupled to the static random access memory, the processor comprising:
   a phase lock loop adapted to provide an output signal;
   a first divider adapted to receive the output signal from the phase lock loop; and a second divider adapted to receive the output signal from the phase lock loop and provide an output signal.

2. The apparatus of claim 1, wherein the second divider of the processor is further adapted to provide the output signal to at least two transistors.

3. The apparatus of claim 2, wherein the first divider of the processor is further adapted to provide an output signal and the phase lock loop is adapted to receive the output signal of the first divider.

4. The apparatus of claim 3, wherein the phase lock loop of the processor is not adapted to receive the output signal of the second divider.

5. The apparatus of claim 1, wherein the processor further comprises a level shifter coupled to the phase lock loop and the second divider.

6. The apparatus of claim 5, wherein the level shifter of the processor is adapted to receive the output signal of the phase lock loop and to provide the second divider with an input signal.

7. The apparatus of claim 1, wherein the phase lock loop of the processor is adapted to operate in a first voltage domain region and the second divider is adapted to operate in a second voltage domain region.

8. The apparatus of claim 7, wherein the processor is further adapted to adjust the voltage potential in the second voltage domain region with respect to the first voltage domain region while the processor is in operation.

9. The apparatus of claim 1, wherein the processor further comprises a voltage regulator adapted to provide an interrupt signal.

10. An integrated circuit comprising:
a phase lock loop adapted to provide an output signal to a feedback divider and a clock divider, wherein the phase lock loop is adapted to receive an output signal of the feedback divider.

11. The integrated circuit of claim 10, wherein the phase lock loop is not coupled to an output signal of the clock divider.

12. The integrated circuit of claim 10, wherein the feedback loop is adapted to provide an output signal that is out of phase with respect to an output signal of the clock divider.

13. The integrated circuit of claim 10, further comprising core logic coupled to receive an output signal from the clock divider.

14. The integrated circuit of claim 13, wherein the core logic is not coupled to the output signal of the feedback loop.

15. A method comprising:
reducing the frequency of a clock signal to at least a portion of a processor while the processor is in operation.

16. The method of claim 15, wherein reducing the frequency includes reducing the frequency to at least a portion of a processor while the processor is executing an instruction.

17. The method of claim 16, wherein reducing the frequency includes reducing the frequency to at least a portion of a processor while the processor is executing an user application.

18. The method of claim 15, further comprising reducing an operational voltage range to at least a portion of the processor while the processor is in operation.

19. The method of claim 15, further comprising providing a clock signal to a clock divider and a feedback divider with a phase lock loop.

20. The method of claim 19, wherein reducing the frequency of the clock signal includes reducing an output signal of the clock divider.

21. The method of claim 20, wherein reducing the output signal of the clock divider includes while substantially maintaining an output signal of the feedback divider.

22. A method of reducing the amount of power consumed by a processor, the processor having a phase lock loop and a clock divider, the method comprising:
reducing the frequency of an output of the clock divider while substantially maintaining the frequency of an input signal to the phase lock loop.

23. The method of claim 22, wherein the processor includes a feedback divider, and substantially maintaining the frequency of the input signal to the phase lock loop includes substantially maintaining the frequency of an output signal of a feedback loop.

24. The method of claim 22, further comprising maintaining operation of at least a portion of the processor while reducing the frequency of the output of the clock divider.

25. The method of claim 24, further comprising reducing a voltage range to at least a portion of the processor.

26. The method of claim 25, further comprising raising the voltage range to at least a portion of the processor.

27. The method of claim 26, further comprising generating an interrupt signal to halt operation of at lest a portion of a first process executing with the processor.

28. The method of claim 26, wherein generating the interrupt signal further comprises substantially simultaneously executing a second process with the processor.

29. An article comprising: a storage medium having stored thereon instructions, that, when executed by a computing platform, results in:
reducing the frequency of a clock divider; and
maintaining the frequency of an output signal of a feedback divider.

30. The article of claim 29, wherein the instructions, when executed, further result in lowing the voltage range to at least a portion of the computing platform.

31. The article of claim 29, wherein the instructions, are executed, upon receiving an interrupt signal from a voltage regulator.

32. An integrated circuit comprising:
a phase lock loop adapted to provide an output signal to a feedback divider and a clock divider, wherein the phase lock loop is adapted to receive an output signal of the feedback divider, and the clock divider is adapted to provide at least two clock signals of different frequency.

33. The integrated circuit of claim 32, wherein the clock divider is adapted to provide the at least two clock signals to different portions of the integrated circuit.

34. The integrated circuit of claim 32, wherein the feedback loop is adapted to provide an output signal that is out of phase with respect to an output signal of the clock divider.

* * * * *